United States Patent

[11] 3,622,962

| [72] | Inventors | Clifford L. Winget<br>Monument Beach;<br>Thomas B. Aldrich, West Falmouth, both of Mass. |
|---|---|---|
| [21] | Appl. No. | 856,293 |
| [22] | Filed | Sept. 9, 1969 |
| [45] | Patented | Nov. 23, 1971 |
| [73] | Assignee | The United States of America as represented by the Secretary of the Navy |

[54] FREE FALL OCEANOGRAPHIC BEACON
6 Claims, 2 Drawing Figs.

[52] U.S. Cl. .................................................. 340/5 R,
340/8 FT, 9/8 R
[51] Int. Cl. ..................................................... B63b 51/02
[50] Field of Search............................................ 340/2, 5, 8
FT; 9/8, 9; 102/13

[56] References Cited
UNITED STATES PATENTS

| 2,820,971 | 1/1958 | Welsh et al. .................. | 9/9 |
| 3,037,217 | 6/1962 | Mandra ......................... | 9/8 |
| 3,384,867 | 5/1968 | Bridges .......................... | 340/2 |
| 3,458,853 | 7/1969 | Daniels et al. ................. | 340/3 |

Primary Examiner—Richard A. Farley
Attorneys—R. I. Tompkins and L. I. Shrago

ABSTRACT: A free fall beacon for marking an ocean bottom location has a buoyant member and an anchor normally locked together by a pressure-operated latching device. The buoyant member and the anchor are interconnected by a tether line which determines the height above the ocean floor at which the buoyant member is moored.

PATENTED NOV 23 1971
3,622,962
Fig.1
Fig.2
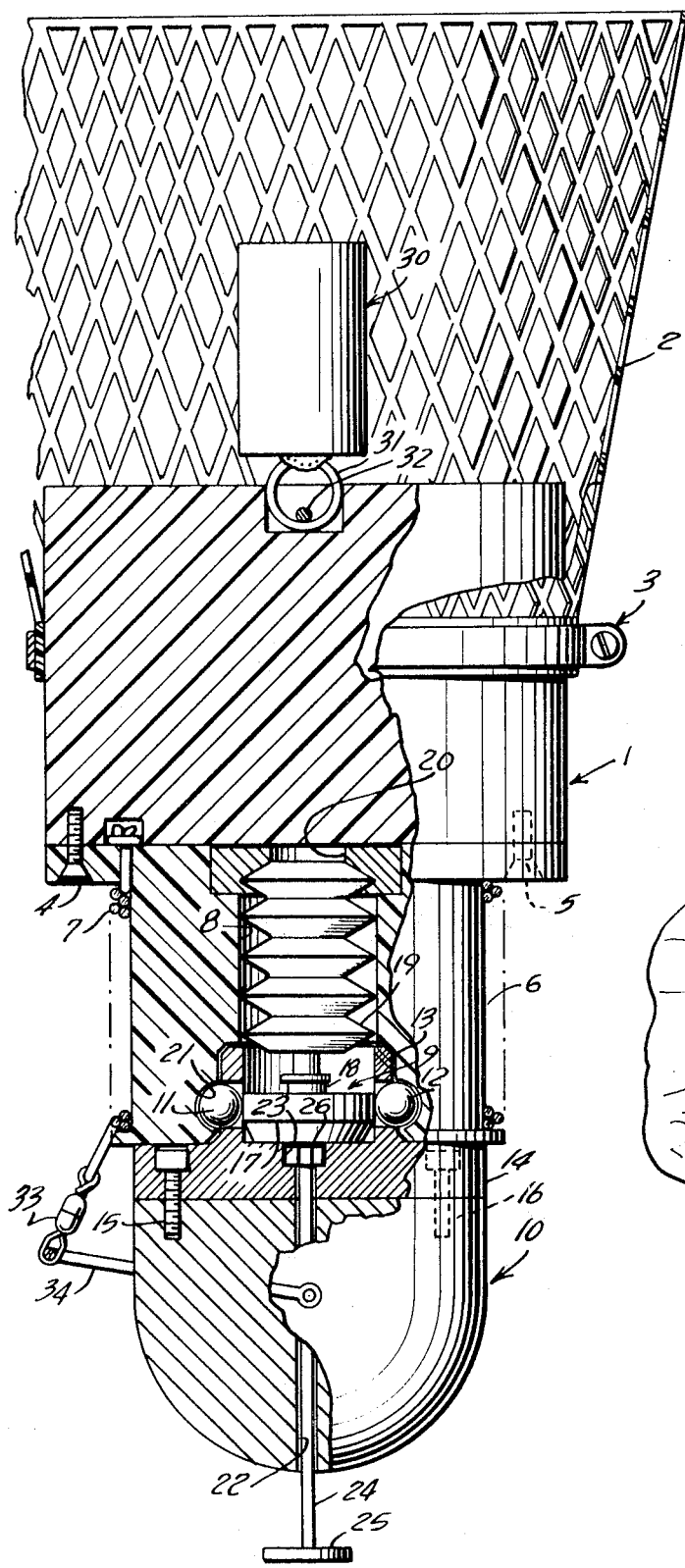
Clifford L. Winget
Thomas B. Aldrich
INVENTORS.
By [signature]
Attorney

FREE FALL OCEANOGRAPHIC BEACON

The invention described herein may be manufactured and used by or for the Government of the United States of America for governmental purposes without the payment of any royalties thereon or therefor.

The present invention relates generally to oceanographic equipment and, more particularly, to a free fall beacon for marking an ocean bottom location.

Free fall devices have been used in the past in connection with a wide variety of oceanographic research. One of the advantages of utilizing free fall instruments is that once launched the apparatus operates independently of the ship's movement. Also, because there is no supporting cable between the instrument and the surface ship, the apparatus can be used from relatively small vessels. The absence of a supporting cable also means that the instrument may be used at any depth. Free fall devices usually have a high rate of descent and, therefore, in an emergency they may be deployed in a relatively short time. A further advantage of the free fall concept is that an instrument embodying this mode of operation does not require expensive bottom signalling systems since there is never an uncertainty about the apparatus ultimately making bottom contact.

The present invention utilizes the free fall principle in the bottom marking beacon disclosed. The beacon is a compact, self-contained assembly that may be quickly released from a surface vessel or a relatively slow moving aircraft to mark a predetermined spot on the ocean floor. Thus, the beacon may serve as a deep ocean navigation aid for deep diving submersibles, Or a multiplicity of beacons may be deployed at the surface in a predetermined geometric pattern so as to provide, for example, widely separated reference points or targets about which an underwater search pattern may be carried out.

The present beacon contains an active acoustic signalling system for identifying its location. After this system ceases to operate as a result of power supply failure, the beacon location can be determined by echo ranging off of an acoustic reflector which forms a portion of the beacon. When deployed, the beacon floats a predetermined distance above the ocean bottom and thus it is "visible" against hilly terrain or any other relatively low obstructions.

It is accordingly a primary object of the present invention to provide a free fall beacon for marking the location of an ocean bottom site.

Another object of the present invention is to provide a free fall marker beacon which may be used as a navigational aid.

A further object of the present invention is to provide a free fall marker beacon which may be readily deployed in single units or in multiple units to establish underwater reference points for underwater search operations.

Other objects, advantages and novel features of the invention will become apparent from the following detailed description of the invention when considered in conjunction with the accompanying drawings wherein:

FIG. 1 illustrates the apparatus in its prelaunch condition; and

FIG. 2 illustrates the beacon moored in its operating condition.

Referring now to FIG. 1 of the drawings which shows the marker buoy in its standby condition, it will be seen that the assembled apparatus has as its buoyant member a cylindrical float 1, made preferably of syntactic foam. This material, as is well known, consists of microsphere hollow glass beads embedded in a resin material or binder. This composition has a density less than that of sea water, and its compressive strength is such that it will not collapse at the high-static pressures encountered in the deepest ocean environment.

A cone-shaped stabilizing fin 2 is secured near the top of float 1 by an adjustable, circumferential clamp 3. This fin is made from an open metallic mesh material having good sound reflecting properties. One of its purposes is to stabilize the marker beacon when it is dropped free at the ocean surface. Also, it restricts the free fall velocity of the assembly so as to give the various components time during the descent period to operate in their proper sequence. Additionally, the fin serves as an acoustic reflector so that the location of the buoy may be ascertained by echo ranging off of this component of the assembly.

Secured to the lower portion of float 1 by suitable bolts, such as 4 and 5, is a Teflon spool 6 which has wrapped about its outer rim portion a coiled tether line 7. One end of this line passes through a hole in the rim portion of this spool and is effectively anchored by being knotted. The other end is connected by a swivel 33 to a bail 34 attached to nose cone lead anchor 10. The length of this tether line establishes the operating height of the float above the ocean bottom. Accommodated within a central bore 8 formed in spool 6 is a release mechanism 9 which operates at a predetermined depth, or failing this, when the apparatus hits bottom, to separate the nose cone lead anchor 10 from the float portion of the beacon. Release mechanism 9 includes a number of detent balls, such as 11 and 12, for example, and a cooperating ball cage assembly 13 which has appropriate apertures for accommodating each of the various balls.

Cage assembly 13 has a base portion 14 which is attached by suitable bolts, such as 15 and 16, to the top of nose cone anchor 10. Cooperating with the ball cage assembly is a release plunger 17 connected by a stub shaft 18 to one end of a closed bellows 19. This end of bellows 19 is free to move. However, its other end is restrained by a retaining clamp 20 which is set into an enlarged cutout portion of bore 8. Release plunger 12, it will be appreciated, is free to move within bore 8, and this movement is in accordance with the pressure acting on the closed end of bellows 19.

When the marker beacon is in its standby or nonoperated condition, bellows 19 is extended to the position shown, and release plunger 12 maintains the detent balls within a retaining recess 21 cut in the inner wall of an increased diameter portion of bore 8. With the balls held in this position, ball cage assembly 13 and nose cone anchor 10 are effectively locked to float 1. If stored in this condition, the apparatus can be launched immediately with no further preparation.

In operation, the free fall bottom marker beacon of FIG. 1 is released from a surface vessel at some predetermined point. As the apparatus descends anchor first through the water, bellows 19 commences to collapse due to the increasing external water pressure. Since the upper end of the bellows is restrained, its other end with release plunger 17 affixed thereto, commences to move upwardly. As this movement continues, a point is reached, corresponding to a predetermined depth, where release plunger 17 no longer contacts the various balls, such as 11 and 12. With nothing restraining these balls, they are now free to fall into the cavity formerly occupied by the plunger. When they do so, ball cage assembly 13 is unlocked from spool 6 and the float portion of the apparatus.

The ball case assembly and its attached nose cone anchor 10 now separate from the float assembly. As this separation takes place, tether line 7 unwinds from the outer rim of spool 6. As the apparatus continues its descent, the float assembly trails behind the nose cone anchor until all of the tether line is unwound. Thereafter, the apparatus remains in this condition with the float and the nose cone anchor now separated by a distance equal to the full extension of the tether line until contact is made with the bottom. After this contact, the float remains moored in a fixed position, as shown in FIG. 2, floating above the ocean bottom at a distance equal to the length of the tether line. In this showing the upper end of the tether line is secured to a bail 35 attached to the rim of spool 6 instead of being knotted.

To facilitate the assembly of the release mechanism, anchor 10 is provided with a central passageway 22. This passageway continues through base plate 14 and terminates in an enlarged recess 23. Slidably accommodated within this passageway is a plunger pin 24. One end of this pin projects beyond nose cone anchor 10 and has a sensor disk 25 affixed thereto. A lock nut 26 is attached to the other end. It will be appreciated that plunger pin 24 may be moved upwardly manually, as shown in FIG. 1, to collapse bellows 19 to the position at which all of the various detent balls 11 and 12 are forced into recess 21. Plunger pin 24 also provides a secondary or backup mechanism for mechanically releasing the float from the cone anchor in the event this action is not produced by the external water pressure. When disk 25 contacts the bottom, the relative movement between plunger pin 24 and the rest of the apparatus causes lock nut 26 to strike release plunger 17 and move this element upwardly, out of engagement with the detent balls. These balls now fall into place due to the upward force produced by the buoyancy of float 1, and the unlocking operation is accomplished. The float assembly thereafter rises to its proper location above the ocean bottom.

In order to identify the location of the planted buoy, a water-actuated underwater sound source 30 is mounted at the top of float 1. In the modification of FIG. 1, this sound source is detachably connected by a ring member 31 which cooperates with a latch 32 recessed in the body of the float.

When the buoy is in position and after a predetermined time interval, sound source 30 commences to radiate, in an omnidirectional manner, a coded pulse signal characteristic of the particular buoy. This transmission continues for the life of the power supply. Thereafter, it will be appreciated, the float, itself, continues to operate as a passive acoustic target because of the performance of conical fin 2.

What is claimed is:

1. A free-fall ocean bottom marker comprising, in combination,
    a generally cylindrical buoyant member having one end body portion of reduced diameter;
    an acoustic reflector secured to said buoyant member at the greater diameter end portion thereof,
        said acoustic reflector being of conical shape and formed from open mesh material so as to stabilize said beacon as it falls within the ocean and restrict its free-fall velocity;
    an anchor;
    a pressure-operated latching means normally locking said anchor to said buoyant member at the reduced diameter portion thereof;
    a tether line having one end secured to said buoyant member and the other end secured to said anchor,
        said tether line being wound about the reduced diameter portion of said buoyant member when said marker beacon is in its standby condition whereby whenever said beacon is dropped free at the ocean surface said pressure-operated latching means unlocks said anchor from said buoyant member at a predetermined depth and said anchor thereafter falls free until said tether line is unwound.

2. In an arrangement as defined in claim 1,
    a bottom-operated release mechanism adapted to unlock said anchor from said buoyant member when said anchor strikes the ocean bottom still locked to said buoyant member whereby whenever said pressure-operated latching means misfunctions and does not unlock said anchor at said predetermined depth said anchor is unlocked when it strikes the ocean bottom.

3. A free-fall beacon for marking a predetermined ocean bottom location comprising, in combination,
    a float,
        said float having a portion thereof which reflects acoustic energy impinging thereon;
    an anchor;
    a tether line having one end secured to said float and the other end to said anchor,
        said tether line being wound about a circumferential portion of said float when said beacon is in its standby condition ready for launching;
    a pressure-operated launching means normally locking said anchor to the bottom portion of said float,
        said launching means unlocking said anchor from said float when said beacon reaches a predetermined depth whereby said anchor thereafter separates from said float and falls free until said tether line is completely unwound from said float;
        said float thereafter being moored at a distance above the ocean floor determined by the length of said tether line;
        said pressure-operating latching means also being adapted to unlock said anchor from said float if said anchor strikes the ocean bottom and still is locked to said float whereby said float is deployed in the event said pressure-operating latching means malfunctions and does not unlock said anchor at said predetermined depth.

4. In an arrangement as defined in claim 3 wherein said portion of said float which reflects acoustic energy impinging thereon has a conical shape which stabilizes said beacon in its proper orientation as it falls within the ocean.

5. In an arrangement as defined in claim 4 wherein said portion of said float which reflects acoustic energy impinging thereon is fabricated from open mesh material which restricts the free-fall velocity of said beacon so as to ensure the operation of said pressure-operated latching means.

6. In an arrangement as defined in claim 3 wherein said float accommodates an acoustic signal device for identifying the location of said beacon after it has been deployed.

* * * * *